US011942038B1

(12) United States Patent
Fan et al.

(10) Patent No.: US 11,942,038 B1
(45) Date of Patent: Mar. 26, 2024

(54) PIXEL DRIVING CIRCUIT, PIXEL DRIVING METHOD AND DISPLAY PANEL

(71) Applicant: HKC CORPORATION LIMITED, Shenzhen (CN)

(72) Inventors: Tao Fan, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/327,265

(22) Filed: Jun. 1, 2023

(30) Foreign Application Priority Data

Nov. 2, 2022 (CN) ........................ 202211359796.0

(51) Int. Cl.
*G09G 3/3233* (2016.01)

(52) U.S. Cl.
CPC ... *G09G 3/3233* (2013.01); *G09G 2300/0804* (2013.01); *G09G 2300/0842* (2013.01); *G09G 2300/0861* (2013.01); *G09G 2310/08* (2013.01)

(58) Field of Classification Search
None
See application file for complete search history.

(56) References Cited

U.S. PATENT DOCUMENTS 11,410,605 B2 8/2022 Hong et al.
2015/0287359 A1* 10/2015 Qing ................... G09G 3/3233 345/76
2015/0325169 A1* 11/2015 Qing ................... G09G 3/3233 345/76
2016/0307510 A1* 10/2016 Duan ................... G09G 3/3258
2017/0200412 A1* 7/2017 Gu ....................... G09G 3/3266
2018/0342206 A1* 11/2018 Zhou ................... G09G 3/3291
(Continued)

FOREIGN PATENT DOCUMENTS

CN 103531150 A 1/2014
CN 106991967 A 7/2017
(Continued)

OTHER PUBLICATIONS

International Search Report and Written Opinion issued in counterpart PCT Application No. PCT/CN2023/094619, dated Jul. 5, 2023.

(Continued)

*Primary Examiner* — Dorothy Harris
(74) *Attorney, Agent, or Firm* — Westbridge IP LLC

(57) ABSTRACT

Disclosed are a pixel driving circuit, a pixel driving method and a display panel. The pixel driving circuit includes the first thin film transistor, the second thin film transistor, the third thin film transistor, the fourth thin film transistor, the fifth thin film transistor, the sixth thin film transistor and the capacitor. The pixel driving circuit can be regarded as a 3 T0.5C circuit structure, so that two adjacent light-emitting devices on the same column can share a pixel driving circuit, and the threshold voltage of the driving thin film transistor and a voltage drop of the supply voltage can be compensated, thus the influence of the threshold voltage defect of the driving thin film transistor and the voltage drop of the supply voltage on the current flowing through the light-emitting device can be eliminated, to improve the display uniformity of the self-light-emitting display panel.

10 Claims, 5 Drawing Sheets

(56) References Cited

U.S. PATENT DOCUMENTS

| | | | | |
|---|---|---|---|---|
| 2019/0066583 | A1* | 2/2019 | Chang | G09G 3/3233 |
| 2021/0201814 | A1 | 7/2021 | Choi | |
| 2021/0335953 | A1 | 10/2021 | Kim et al. | |

FOREIGN PATENT DOCUMENTS

| | | | |
|---|---|---|---|
| CN | 107230455 | A | 10/2017 |
| CN | 107507568 | A | 12/2017 |
| CN | 110264953 | A | 9/2019 |
| CN | 111063306 | A | 4/2020 |
| CN | 112017589 | A | 12/2020 |
| CN | 114038425 | A | 2/2022 |
| CN | 115410526 | A | 11/2022 |
| JP | 2021067901 | A | 4/2021 |
| KR | 20160082867 | A | 7/2016 |

OTHER PUBLICATIONS

Notification of Registration Procedures and Notification of Granting a Patent Right issued in counterpart Chinese Patent Application No. 202211359796.0, dated Dec. 7, 2022.

* cited by examiner

PIXEL DRIVING CIRCUIT, PIXEL DRIVING METHOD AND DISPLAY PANEL

CROSS-REFERENCE TO RELATED APPLICATIONS

This application claims priority to Chinese Patent Application No. 202211359796.0, filed on Nov. 2, 2022, the entire contents of which are incorporated herein by reference.

TECHNICAL FIELD

The present application relates to the technical field of pixel driving, and in particular to a pixel driving circuit, a pixel driving method and a display panel.

BACKGROUND

Currently, for display panels that use light-emitting devices as pixels, each light-emitting device needs to be equipped with a pixel driving circuit, but each existing pixel driving circuit often requires six or more thin film transistors to compensate threshold voltages of the driving thin film transistors, thereby affecting a transmission rate of the display panel.

SUMMARY

The main objective of the present application is to provide a pixel driving circuit, which aims to solve a problem that a transmission rate of the self-light-emitting display panel is lower.

In order to achieve the above objective, the present application provides a pixel driving circuit, applied to a display panel provided with a pixel array. The pixel array includes a first light-emitting device and a second light-emitting device adjacent to each other and located on a same column;

an anode of the first light-emitting device is connected to a first node and a cathode of the first light-emitting device is connected to a first supply voltage;

an anode of the second light-emitting device is connected to a third node and a cathode of the second light-emitting device is connected to a second supply voltage;

the pixel driving circuit includes a first thin film transistor, a second thin film transistor, a third thin film transistor, a fourth thin film transistor, a fifth thin film transistor, a sixth thin film transistor and a capacitor;

a controlled end of the first thin film transistor is connected to a first control signal, a first end of the first thin film transistor is connected to the first supply voltage and a second end of the first thin film transistor is connected to the first node;

a controlled end of the second thin film transistor is connected to a second control signal, a first end of the second thin film transistor is connected to a fourth node and a second end of the second thin film transistor is connected to the second end of the first thin film transistor;

a controlled end of the third thin film transistor is connected to a scanning signal, a first end of the third thin film transistor is connected to a data signal and a second end of the third thin film transistor is connected to a second node;

a controlled end of the fourth thin film transistor is connected to the fourth node, a first end of the fourth thin film transistor is connected to the first node and a second end of the fourth thin film transistor is connected to a third node;

a controlled end of the fifth thin film transistor is connected to a third control signal, a first end of the fifth thin film transistor is connected to the fourth node and a second end of the fifth thin film transistor is connected to the third node;

a controlled end of the sixth thin film transistor is connected to a fourth control signal, a first end of the sixth thin film transistor is connected to the second end of the fifth thin film transistor, a second end of the sixth thin film transistor is connected to the second supply voltage; and an end of the capacitor is connected to the second node and another end of the capacitor is connected to the fourth node.

In an embodiment, the first control signal, the second control signal, the third control signal, the fourth control signal, the first supply voltage, the second supply voltage, the scanning signal, and the data signal are combined and applied successively to a first reset stage, a first sampling stage, a first data writing stage, a first light-emitting stage, a second reset stage, a second sampling stage, a second data writing stage, and a second light-emitting stage; and the first light-emitting device emits light in the first light-emitting stage, and the second light-emitting device emits light in the second light-emitting stage.

In an embodiment, in the first reset stage and the second reset stage, the first thin film transistor, the second thin film transistor, the third thin film transistor, the fourth thin film transistor, the fifth thin film transistor and the sixth thin film transistor are turned on; and the data signal, the first supply voltage and the second supply voltage are at low potential.

In an embodiment, in the first sampling stage, the second thin film transistor and the sixth thin film transistor are turned on, the first thin film transistor, the third thin film transistor and the fifth thin film transistor are turned off, the data signal is at low potential, the first supply voltage and the second supply voltage are at high potential, and a potential of the fourth node is a difference between absolute values of the second supply voltage and a threshold voltage of the fourth thin film transistor; and in the second sampling stage, the first thin film transistor, the third thin film transistor, and the fifth thin film transistor are turned on, the second thin film transistor and the sixth thin film transistor are turned off, the data signal is at the low potential, the first supply voltage and the second supply voltage are at the high potential, and the potential of the fourth node is a difference between absolute values of the first supply voltage and the threshold voltage of the fourth thin film transistor.

In an embodiment, the first light-emitting device is in a reverse bias state in the first sampling stage, and the second light-emitting device is in the reverse bias state in the second sampling stage.

In an embodiment, in the first data writing stage, the second thin film transistor is turned on, the first thin film transistor, the fifth thin film transistor and the sixth thin film transistor are turned off, the third thin film transistor is turned on in a preset substage and the third thin film transistor is turned off outside the preset substage;

the data signal, the first supply voltage and the second supply voltage are at high potential, a potential of the fourth node is a sum of a difference between absolute values of the second supply voltage and a threshold voltage of the fourth thin film transistor and the data signal; and in the second data writing stage, the fifth thin film transistor is turned on, the first thin film transistor, the second thin film transistor and the sixth thin film transistor are turned off, the third thin film transistor is turned on in the preset substage, the third thin film transistor is turned off outside the preset substage, the data signal, the first supply voltage and the second supply voltage are at the high potential, and the potential of the fourth node is a sum of a difference between absolute values of the first supply voltage and the threshold voltage of the fourth thin film transistor and the data signal.

In an embodiment, in the first light-emitting stage, the sixth thin film transistor is turned on, the first thin film transistor, the second thin film transistor, the third thin film transistor and the fifth thin film transistor are turned off, the first supply voltage is at negative potential, the second supply voltage is at high potential and the data signal is at low potential; and in the second light-emitting stage, the first thin film transistor is turned on, the second thin film transistor, the third thin film transistor, the fifth thin film transistor and the sixth thin film transistor are turned off, the first supply voltage is at the high potential, the second supply voltage is at the negative potential and the data signal is at the low potential.

In an embodiment, when the first light-emitting device and the second light-emitting device emit light, a current flowing through the first light-emitting device and the second light-emitting device keeps constant with a change in a threshold voltage of the fourth thin film transistor.

The present application also provides a pixel driving method, applied to the pixel driving circuit as mentioned above, including:

in a first reset stage, controlling the first thin film transistor, the second thin film transistor, the third thin film transistor, the fourth thin film transistor, the fifth thin film transistor, and the sixth thin film transistor to turn on, and controlling the data signal, the first supply voltage, and the second supply voltage to be at low potential;

in a first sampling stage, controlling the second thin film transistor and the sixth thin film transistor to turn on, and controlling the first thin film transistor, the third thin film transistor, and the fifth thin film transistor to turn off, and controlling the data signal to be at the low potential, the first supply voltage and the second supply voltage to be at high potential, to make a potential of the fourth node to be a difference between absolute values of the second supply voltage and a threshold voltage of the fourth thin film transistor;

in a first data writing stage, controlling the second thin film transistor to turn on, and controlling the first thin film transistor, the fifth thin film transistor, and the sixth thin film transistor to turn off, and controlling the third thin film transistor to turn on in a preset substage, and controlling the third thin film transistor to turn off outside the preset substage, and controlling the data signal, the first supply voltage and the second supply voltage to be at the high potential, to make the potential of the fourth node to be a sum of the difference between the absolute values of the second supply voltage and the threshold voltage of the fourth thin film transistor and the data signal;

in a first light-emitting stage, controlling the sixth thin film transistor to turn on, and controlling the first thin film transistor, the second thin film transistor, the third thin film transistor and the fifth thin film transistor to turn off, and controlling the first supply voltage to be at negative potential, and controlling the second supply voltage to be at the high potential, and controlling the data signal to be at the low potential, to make the first light-emitting device to emit light;

in a second reset stage, controlling the first thin film transistor, the second thin film transistor, the third thin film transistor, the fourth thin film transistor, the fifth thin film transistor and the sixth thin film transistor to turn on, and controlling the data signal, the first supply voltage and the second supply voltage to be at the low potential;

in a second sampling stage, controlling the first thin film transistor, the third thin film transistor, the fifth thin film transistor to turn on, and controlling the second thin film transistor and the sixth thin film transistor to turn off, and controlling the data signal to be at the low potential, and controlling the first supply voltage and the second supply voltage to be at the high potential, to make the potential of the fourth node to be a difference between absolute values of the first supply voltage and the threshold voltage of the fourth thin film transistor;

in a second data writing stage, controlling the fifth thin film transistor to turn on, and controlling the first thin film transistor, the second thin film transistor and the sixth thin film transistor to turn off, and controlling the third thin film transistor to turn on in the preset substage, and controlling the third thin film transistor to turn off outside the preset substage, and controlling the data signal, the first supply voltage and the second supply voltage to be at the high potential, to make the potential of the fourth node to be a sum of the difference between the absolute values of the first supply voltage and the threshold voltage of the fourth thin film transistor and the data signal; and in a second light-emitting stage, controlling the first thin film transistor to turn on, and controlling the second thin film transistor, the third thin film transistor, the fifth thin film transistor and the sixth thin film transistor to turn off, and controlling the first supply voltage to be at the high potential, and controlling the second supply voltage to be at the negative potential, and controlling the data signal to be at the low potential, to make the second light-emitting device to emit light.

The present application also provides a display panel, including:

a pixel array including a first light-emitting device and a second light-emitting device adjacent to each other and located on a same column; and the pixel driving circuit as mentioned above, the pixel driving circuit being connected to the first light-emitting device and the second light-emitting device.

The technical solution of the present application adopts the first thin film transistor, the second thin film transistor, the third thin film transistor, the fourth thin film transistor, the fifth thin film transistor, the sixth thin film transistor and the capacitor to form a pixel driving circuit of 3T0.5C circuit structure, so that two adjacent light-emitting devices on the same column can share a pixel driving circuit, and the threshold voltage of the driving thin film transistor and a voltage drop of the supply voltage can be compensated, thus the influence of the threshold voltage defect of the driving thin film transistor and the voltage drop of the supply voltage on the current flowing through the light-emitting device can be eliminated, to improve the display uniformity of the self-light-emitting display panel. Compared with at least 12 thin film transistors required for two separate pixel driving circuits, the number of thin film transistors is greatly reduced, to greatly improve the transmission rate of the panel. In addition, the pixel driving circuit of the present application can make the first light-emitting device and the second light-emitting device to be in reverse bias state, to reduce the aging speed of the light-emitting device, which is conducive to increasing the service life of the self-light-emitting display panel.

BRIEF DESCRIPTION OF THE DRAWINGS

In order to more clearly illustrate the technical solutions in the embodiments of the present application or related art, the following is a brief description of the drawings for the description of the embodiments or related art, it is obvious that the drawings in the following description are only some of the embodiments of the present application, other structures can be obtained by those skilled in the art according to structures in these drawings without creative works.

Figure 1:
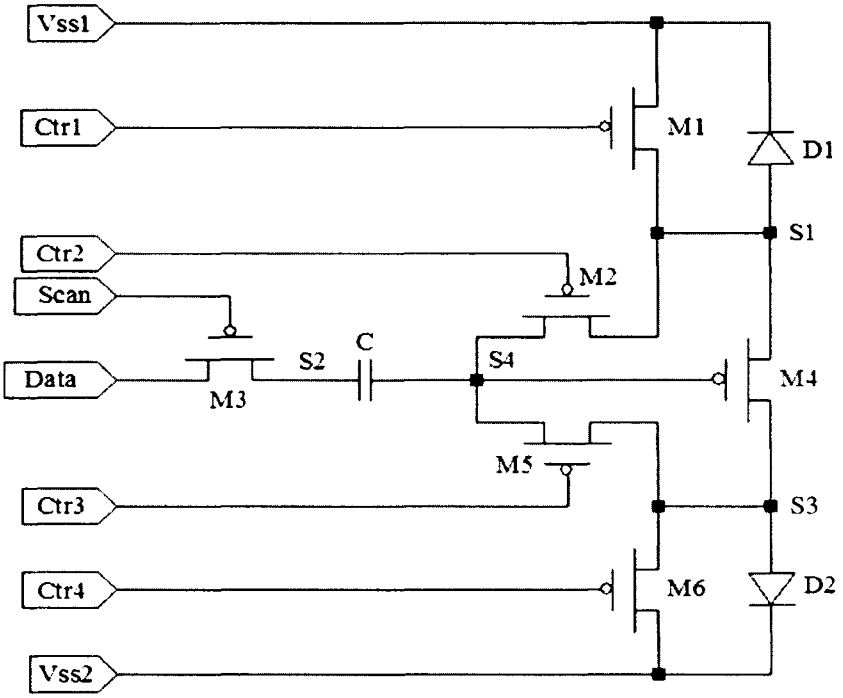
FIG. 1 is a schematic diagram of a pixel driving circuit according to a first embodiment of the present application.

The realization of the purpose, functional features and advantages of the present application will be further illustrated with reference to the drawings in conjunction with the embodiments.

DETAILED DESCRIPTION OF THE EMBODIMENTS

The technical solutions in the embodiments of the present application will be clearly and completely described below in conjunction with the drawings in the embodiments of the present application, and it is clear that the described embodiments are only some of the embodiments of the present application, and not all of them. Based on the embodiments in the present application, all other embodiments obtained by those skilled in the art fall within the scope of the present application without creative labor.

In addition, the descriptions such as "first" and "second" in the present application are for descriptive purposes only and are not to be construed as indicating or implying their relative importance or implicitly specifying the number of technical features indicated. Thus, the features defined with "first" and "second" may explicitly or implicitly include at least one such feature. In addition, the technical solutions of each embodiment can be combined with each other, but only on the basis that they can be achieved by those skilled in the art, when the combination of technical solutions appear to contradict each other or can not be achieved, it should be considered that this combination of technical solutions does not exist, and is not within the scope of the present application.

First Embodiment

The present application provides a pixel driving circuit that can be applied to a display panel.

The display panel may include a pixel layer, a light-emitting layer, a driving circuit layer and an array substrate arranged in sequence. The driving circuit layer is provided on the array substrate. The pixel layer may include a plurality of pixels arranged in an array, and the light-emitting layer is provided with a light-emitting device for each pixel. The driving circuit layer may include a plurality of pixel driving circuits, each pixel driving circuit is connected to a light-emitting device, and each pixel driving circuit is used to drive the light-emitting device of the corresponding pixel to emit light, to realize the self-light-emitting display of the display panel. Light-emitting devices can be organic light-emitting diodes (OLED), mini-LEDs or micro-LEDs, without limitation here. The embodiment of the present application takes that light-emitting devices are organic light-emitting diodes as an example to illustrate.

In practical applications, the pixel driving circuit may be provided with a driving thin film transistor for controlling the flow of current through the light-emitting device, and the threshold voltage of the driving thin film transistor has a non-uniformity problem, and the threshold voltage will also drift with an increase of operating time to cause the display panel to produce uneven brightness cloud patterns. In order to solve above defects of the threshold voltage, the existing technology usually increases the number of thin film transistors and increases the storage capacitor C, resulting in that the number of thin film transistors in each pixel driving circuit is 6 or more, and it can be noted from the location of the driving circuit layer where the pixel driving circuit is located in in the display panel that the more the number of thin film transistors in each pixel driving circuit, the less light from the light-emitting layer passing through the driving circuit layer, and the lower the transmission rate of the display panel. Secondly, the pixel driving circuit also needs to access the supply voltage to drive the corresponding light-emitting devices, the power supply line itself has a certain degree of internal resistance, so that the actual supply voltage delivered to the light-emitting devices has a voltage drop, and because the voltage drops of the supply voltages of different display devices are different, which will lead to uneven luminance of the light-emitting devices and a faster aging speed of the light-emitting devices in the pixel driving circuit due to being in the forward bias state, to cause a lower service life of the self-light-emitting display panel.

In view of the above problems, the present application provides a pixel driving circuit for driving two light-emitting devices adjacent to each other and located on a same column in a pixel array, the first light-emitting device D1 may be a light-emitting device on an odd number of rows and the second light-emitting device D2 may be a light-emitting device on an even number of rows.

Referring to FIG. 1, the pixel driving circuit of the present application includes a first thin film transistor M1, a second thin film transistor M2, a third thin film transistor M3, a fourth thin film transistor M4, a fifth thin film transistor M5, a sixth thin film transistor M6, and a capacitor C. The first thin film transistor M1 and the second thin film transistor M2 are used to control the first light-emitting device D1 to emit light and the charge clearing of the first node A1. The third thin film transistor M3 is a data writing thin film transistor. The fourth thin film transistor M4 is the driving thin film transistor for both the first light-emitting device D1 and the second light-emitting device D2. The fifth thin film transistor M5 and the sixth thin film transistor M6 are used to control the second light-emitting device D2 to emit light and the charge clearing of the third node A3. The capacitor C may be a storage capacitor C. The first thin film transistor M1, the second thin film transistor M2, the third thin film transistor M3, the fourth thin film transistor M4, the fifth thin film transistor M5, and the sixth thin film transistor M6 may all be oxide semiconductor thin film transistors, low temperature polycrystalline silicon thin film transistors, or amorphous silicon thin film transistors, i.e., the types of thin film transistors T1 to T7 may all be Indium Gallium Zinc Oxide (IGZO), Low Temperature Poly-silicon (LTPS), or Amorphous Silicon (A-Si). Of course, the thin film transistors M1 to M6 can adopts different types of thin film transistors, respectively, their combination are various, which will not be described here. In the embodiment, the first thin film transistor M1, the second thin film transistor M2, the third thin film transistor M3, the fourth thin film transistor M4, the fifth thin film transistor M5, and the sixth thin film transistor M6 can be P-type thin film transistors. It is understood that a controlled end of the thin film transistor may be a gate, one of the first end and the second end of the thin film transistor may be a source, and the other of the first end and the second end of the thin film transistor may be a drain. The first end and the second end of the thin film transistor can be connected when the thin film transistor is turned on, and the first end and the second end of the thin film transistor can be disconnected when the thin film transistor is turned off.

A controlled end of the first thin film transistor M1 is connected to a first control signal Ctr1, a first end of the first thin film transistor M1 is connected to a first supply voltage Vss1, and a second end of the first thin film transistor M1 is connected to a first node A1.

A controlled end of the second thin film transistor M2 is connected to a second control signal Ctr2, a first end of the second thin film transistor M2 is connected to a fourth node A4 and a second end of the second thin film transistor M2 is connected to the second end of the first thin film transistor M1.

A controlled end of the second thin film transistor M3 is connected to a scanning signal Scan, a first end of the second thin film transistor M3 is connected to a data signal Data and a second end of the second thin film transistor M3 is connected to a second node A2.

A controlled end of the fourth thin film transistor M4 is connected to a fourth node A4, a first end of the fourth thin film transistor M4 is connected to the first node A1 and a second end of the fourth thin film transistor M4 is connected to a third node A3.

A controlled end of the fifth thin film transistor M5 is connected to a third control signal Ctr3, a first end of the fifth thin film transistor M5 is connected to the fourth node A4 and a second end of the fifth thin film transistor M5 is connected to the third node A3.

A controlled end of the sixth thin film transistor M6 is connected to the fourth control signal Ctr4, a first end of the sixth thin film transistor M6 is connected to the second end of the fifth thin film transistor M5, and a second end of the sixth thin film transistor M6 is connected to a second supply voltage Vss2.

An end of the capacitor C is connected to the second node A2, and another end of the capacitor C is connected to the fourth node A4.

An anode of the first light-emitting device D1 is connected to the first node A1, and a cathode of the first light-emitting device D1 is connected to the first supply voltage Vss1. The anode of the second light-emitting device D2 is connected to the third node A3, and the cathode of the second light-emitting device D2 is connected to the second supply voltage Vss2.

In a first reset stage T1, a first sampling stage T2, a first data writing stage T3, a first light-emitting stage T4, a second reset stage, a second sampling stage T6, a second data writing stage T7, and a second light-emitting stage T8, the scanning signal Scan, the first control signal Ctr1, the second control signal Ctr2, the third control signal Ctr3, the fourth control signal Ctr4, the first supply voltage Vss1, the second supply voltage Vss2 and the data signal Data are controlled to be at different potentials, so that the pixel driving circuit of the present application can drive the first light-emitting device D1 and the second light-emitting device D2 to emit light successively. In other words, the pixel driving circuit of the present application can be regarded as a 3T0.5C circuit structure.

It should be noted that the first control signal Ctr1, the second control signal Ctr2, the third control signal Ctr3, the fourth control signal Ctr4, the scanning signal Scan and the data signal Data can be obtained from the output of an external timing controller, and the first supply voltage Vss1 and the second supply voltage Vss2 can be obtained from the output of an external common voltage generation circuit.

In this way, two adjacent light-emitting devices on the same column can share a pixel driving circuit, and the threshold voltage of the fourth thin film transistor M4 and a voltage drop of the supply voltage can be compensated, thus the influence of the threshold voltage defect of the driving thin film transistor and the voltage drop of the supply voltage on the current flowing through the light-emitting device can be eliminated, to improve the display uniformity of the self-light-emitting display panel. Compared with at least 12 thin film transistors required for two separate pixel driving circuits, the number of thin film transistors is greatly reduced, to greatly improve the transmission rate of the panel. In addition, the pixel driving circuit of the present application can make the first light-emitting device D1 and the second light-emitting device D2 to be in reverse bias state, to reduce the aging speed of the light-emitting device, which is conducive to extending the service life of the self-light-emitting display panel.

In an embodiment, the first control signal Ctr1, the second control signal Ctr2, the third control signal Ctr3, the fourth control signal Ctr4, the first supply voltage Vss1, the second supply voltage Vss2, the scanning signal Scan, and the data signal Data are combined to and applied successively to the first reset stage T1, the first sampling stage T2, the first data writing stage T3, the first light-emitting stage T4, the second reset stage T5, the second sampling stage T6, the second data writing stage T7, and the second light-emitting stage T8. The first light-emitting device D1 emits light in the first light-emitting stage T4, and the second light-emitting device D2 emits light in the second light-emitting stage T8.

Figure 2:
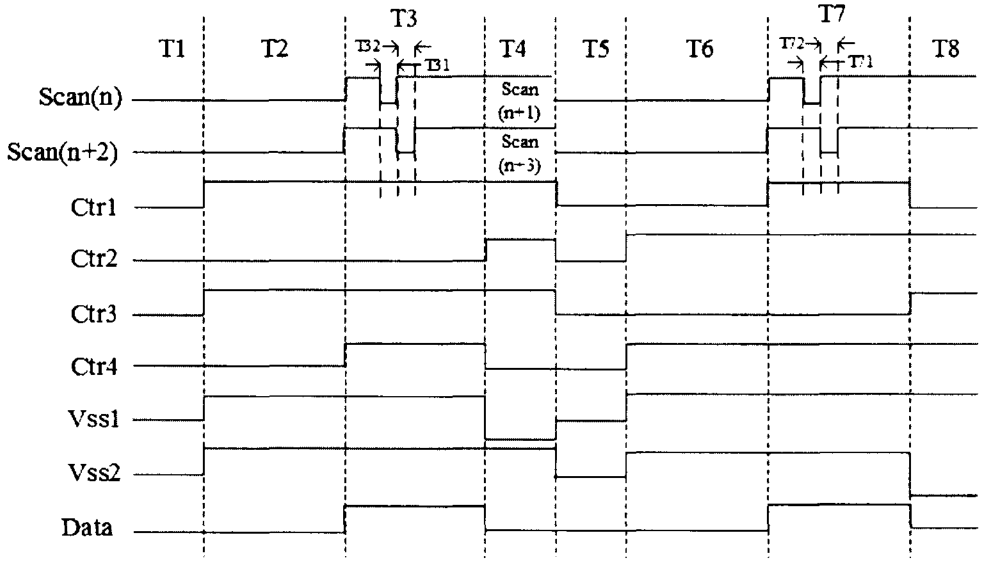
FIG. 2 is a schematic diagram of a timing of the pixel driving circuit according to the first embodiment of the present application.

Referring to FIGS. 1 and 2, FIG. 1 may also be a schematic diagram of the pathway of the pixel driving circuit of the present application in the first reset stage T1 under the driving timing shown in FIG. 2. In the first reset stage T1, the scanning signal Scan, the first control signal Ctr1, the second control signal Ctr2, the third control signal Ctr3, the fourth control signal Ctr4, the first supply voltage Vss1, the second supply voltage Vss2, and the data signal Data are all at low potential to control the first thin film transistor M1, the second thin film transistor M2, the third thin film transistor M3, the fourth thin film transistor M4, the fifth thin film transistor M5, and the sixth thin film transistor M6 to be turned on. At this time, the data signal Data, the first supply voltage Vss1, and the second supply voltage Vss2 are at the low potential. It should be noted that the low potentials of the data signal Data, the first supply voltage Vss1, and the second supply voltage Vss2 in the present application are 0V, to clear the residual charge of the pixel driving circuit, to reset an terminal voltage of the capacitor C and the potential value of the controlled end of the fourth thin film transistor M4 to 0 quasi-location.

Figure 3:
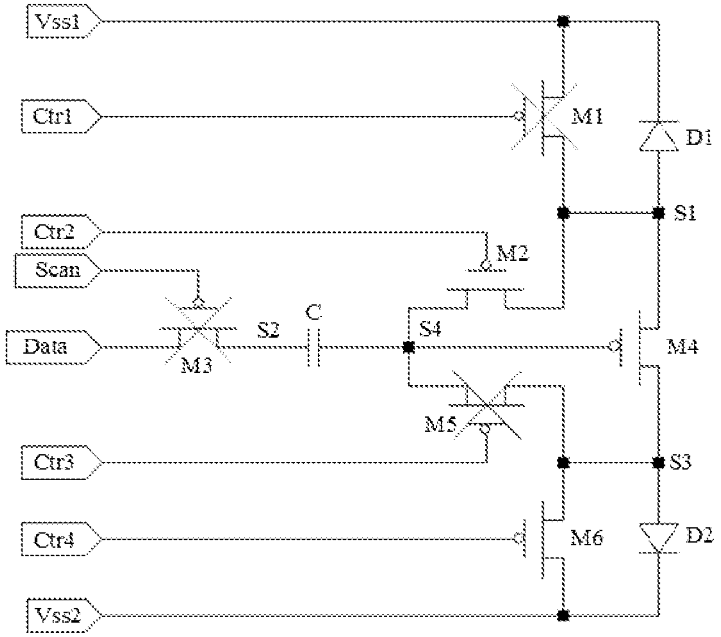
FIG. 3 is a schematic diagram of a pathway of the pixel driving circuit in a first sampling stage according to the first embodiment of the present application.

Referring to FIGS. 1, 2 and 3, FIG. 3 is a schematic diagram of the pathway of the pixel driving circuit of the present application in the first sampling stage T2 under the driving timing shown in FIG. 2. In the first sampling stage T2, the second control signal Ctr2 and the fourth control signal Ctr4 are both at the low potential to control the second thin film transistor M2 and the sixth thin film transistor M6 to turn on. The first control signal Ctr1, the scanning signal Scan, and the third control signal Ctr3 are all at the high potential to control the first thin film transistor M1, the third thin film transistor M3, and the fifth thin film transistor M5 to turn off. At this time, the data signal Data is at the low potential, the first supply voltage Vss1 and the second supply voltage Vss2 are at the high potential, and the terminal voltage of capacitor C remains 0V due to the coupling effect of capacitor C. The potential of the controlled end of the fourth thin film transistor M4, i.e., the potential of the fourth node A4, can be charged to the difference between absolute values of the second supply voltage Vss2 and the threshold voltage of the fourth thin film transistor M4, which is expressed by the formula $V_G=V_{S2}-|V_{TH}|$, $V_G$ is a potential value of the controlled end of the fourth thin film transistor M4, $V_{S2}$ is a potential value of the second supply voltage Vss2, and $V_{TH}$ is the threshold voltage of the fourth thin film transistor M4. Secondly, the potential value of the first node A1 is less than the high potential of the first supply voltage Vss1 at this time to make the first light-emitting device D1 be in the reverse bias state, to improve the aging process of the first light-emitting device D1.

Figure 4:
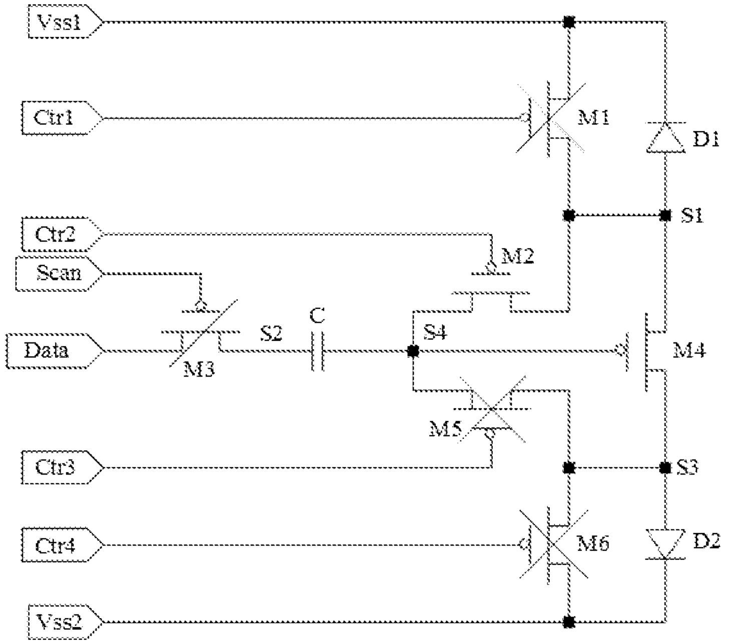
FIG. 4 is a schematic diagram of the pathway of the pixel driving circuit in a first data stage according to the first embodiment of the present application.

Referring to FIG. 1, FIG. 2 and FIG. 4, FIG. 4 is a schematic diagram of the pathway of the pixel driving circuit of the present application in the first data writing stage T3 under the driving timing shown in FIG. 2. In the first data writing stage T3, the second control signal Ctr2 is at the low potential to control the second thin film transistor M2 to turn on. The first control signal Ctr1, the third control signal Ctr3, and the fourth control signal Ctr4 are all at the high potential to control the first thin film transistor M1, the fifth thin film transistor M5, and the sixth thin film transistor M6 to turn off. The scanning signal Scan is at the low potential in the preset substage T31 to control the third thin film transistor M3 to turn on in the preset substage T31, and the scanning signal Scan is at the high potential in the first data writing stage T3 other than the preset substage T31 to control the third thin film transistor M3 to turn off outside the preset substage T31. At this time, the data signal Data, the first supply voltage Vss1 and the second supply voltage Vss2 are all at the high potential, so that the data signal Data is written to the second node A2 via the third thin film transistor M3, and the potential of the fourth node A4 is a sum of a difference between absolute values of the second supply voltage Vss2 and the threshold voltage of the fourth thin film transistor M4 and the data signal Data, which is expressed by the formula $V_G=V_{S2}-|V_{TH}|+V_{DATA}$, $V_{DATA}$ is the potential of data signal Data. It should be noted that, for the closest two first light-emitting devices D1 on the same column, a rising edge (a signal edge from low potential to high potential) of the scanning signal Scan (n) of the first light-emitting device D1 that emits light first at the end of its preset substage T31 corresponds to a rising edge of the scanning signal Scan (n+2) (a signal edge from high potential to low potential) of the light-emitting device that emits light later at the beginning of its preset substage T32.

Figure 5:
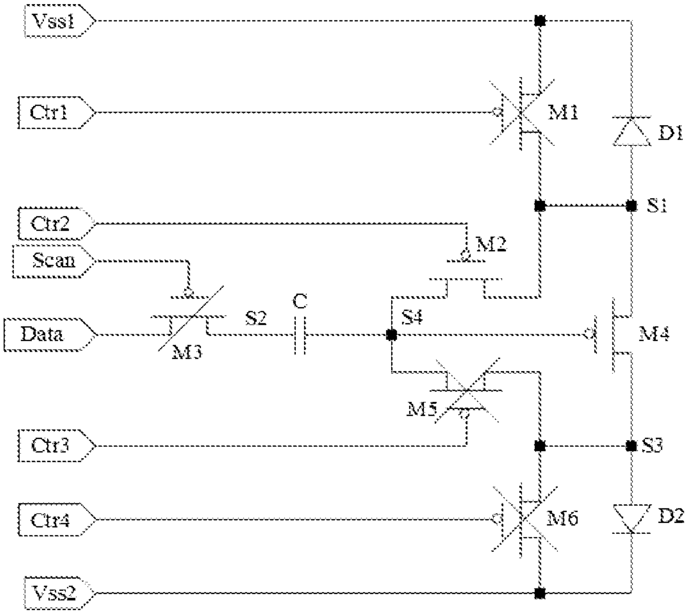
FIG. 5 is a schematic diagram of the pathway of the pixel driving circuit in a first light-emitting writing stage according to the first embodiment of the present application.

Referring to FIG. 1, FIG. 2 and FIG. 5, FIG. 5 is a schematic diagram of the pathway of the pixel driving circuit of the present application in the first light-emitting stage T4 under the driving timing shown in FIG. 2. In the first light-emitting stage T4, the fourth control signal Ctr4 is at the low potential to control the sixth thin film transistor M6 to turn on. The first control signal Ctr1, the second control signal Ctr2, the scanning signal Scan and the third control signal Ctr3 are all at the high potential to control the first thin film transistor M1, the second thin film transistor M2, the third thin film transistor M3 and the fifth thin film transistor M5 to turn off. At this time, the first supply voltage Vss1 is at negative potential, the second supply voltage Vss2 is at the high potential, and the data signal Data is at the low potential. It should be noted that the negative potential of the first supply voltage Vss1 is less than its low potential, such that the potential of third node A3 can be pulled up to the high potential of the second supply voltage Vss2, and the fourth thin film transistor M4 is turned on to generate the current flowing through the first light-emitting device D1, to drive the first light-emitting device D1 to emit light, the current flowing through the first light-emitting device D1 can be expressed by $$I_{OLED1}=\frac{1}{2}\times\mu\times\frac{W}{L}\times C_{GI}\times(V_{sg}-V_{th})^2=\frac{1}{2}\times\mu\times\frac{W}{L}\times C_{GI}\times(V_S-V_G-|V_{TH}|)^2=\frac{1}{2}\times\mu\times\frac{W}{L}\times C_{GI}\times(V_{S2}-(V_{S2}-|V_{TH}|+V_{DATA})-|V_{TH}|)^2=\frac{1}{2}\times\mu\times\frac{W}{L}\times C_{GI}\times(V_{DATA})^2$$

μ is a carrier mobility of the fourth thin film transistor M4, W is a channel width of the fourth thin film transistor M4, L is a channel length of the fourth thin film transistor M4, and $C_{GI}$ is a gate capacitor C of the fourth thin film transistor M4. It can be seen that the current flowing through the first light-emitting device D1 when the first light-emitting device D1 emits light is only related to the data signal Data, and is not related to the threshold voltage of the fourth thin film transistor M4, the first supply voltage Vss1 and second supply voltage Vss2, that is, it does not vary with the change in the threshold voltage of the fourth thin film transistor M4, the first supply voltage Vss1 and the second supply voltage Vss2, to eliminate the influence of the threshold voltage defect of the fourth thin film transistor M4 and the voltage drop of the supply voltage on the current flowing through the first light-emitting device D1.

Referring to FIGS. 1 and 2, FIG. 1 may also be a schematic diagram of the pathway of the pixel driving circuit of the present application in the second light-emitting stage T8 under the driving timing shown in FIG. 2. In the second reset stage T5, the scanning signal Scan, the first control signal Ctr1, the second control signal Ctr2, the third control signal Ctr3, the fourth control signal Ctr4, the first supply voltage Vss1, the second supply voltage Vss2, and the data signal Data are all at the low potential to control the first thin film transistor M1, the second thin film transistor M2, the third thin film transistor M3, the fourth thin film transistor M4, the fifth thin film transistor M5, and the sixth thin film transistor M6 to turn on. At this time, the data signal Data, the first supply voltage Vss1, and the second supply voltage Vss2 are at the low potential to clear the residual charge of the pixel driving circuit, to reset the terminal voltage of the capacitor C and the potential value of the controlled end of the fourth thin film transistor M4 to 0 quasi-location again.

Figure 6:
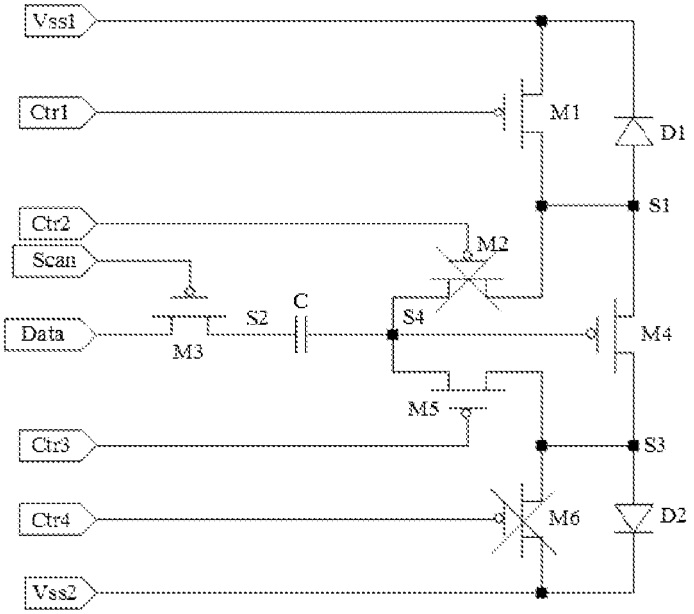
FIG. 6 is a schematic diagram of the pathway of the pixel driving circuit in a second sampling stage according to the first embodiment of the present application.

Referring to FIGS. 1, 2 and 6, FIG. 6 is a schematic diagram of the pathway of the pixel driving circuit of the present application in the second sampling stage T6 under the driving timing shown in FIG. 2. In the second sampling stage T6, the first control signal Ctr1, the scanning signal Scan, and the third control signal Ctr3 are all at the low potential to control the first thin film transistor M1, the third thin film transistor M3, and the fifth thin film transistor M5 to turn on. The second control signal Ctr2 and the fourth control signal Ctr4 are both at the high potential to control the second thin film transistor M2 and the sixth thin film transistor M6 to turn off. At this time, the data signal Data is at the low potential, the first supply voltage Vss1 and the second supply voltage Vss2 are at the high potential, and the terminal voltage of the capacitor C remains 0V due to the coupling effect of the capacitor C. The potential of the controlled end of the fourth thin film transistor M4, i.e., the potential of the fourth node A4, can be charged to the difference between absolute values of the first supply voltage Vss1 and the threshold voltage of the fourth thin film transistor M4, which is expressed by the formula $V_G=V_{S1}-|V_{TH}|$, $V_{S1}$ is a potential value of the first supply voltage Vss1. Secondly, the potential value of the third node A3 is less than the high potential of the second supply voltage Vss2, to make the second light-emitting device D2 to be in the reverse bias state, to improve the aging process of the second light-emitting device D2.

Figure 7:
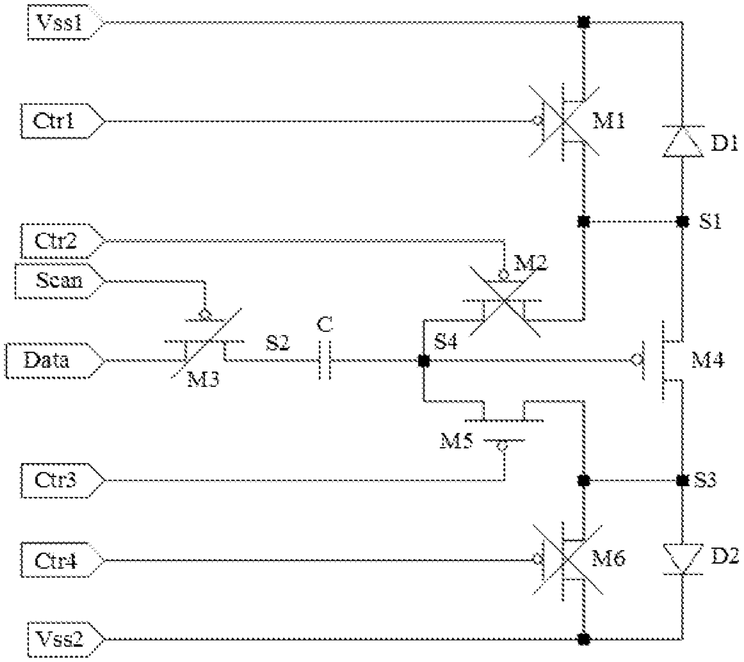
FIG. 7 is a schematic diagram of the pathway of the pixel driving circuit in a second data stage according to the first embodiment of the present application.

Referring to FIGS. 1, 2 and 7, FIG. 7 is a schematic diagram of the pathway of the pixel driving circuit of the present application in the second data writing stage T7 under the driving timing shown in FIG. 2. In the second data writing stage T7, the third control signal Ctr3 is at the low potential to control the fifth thin film transistor M5 to turn on. The first control signal Ctr1, the second control signal Ctr2, and the fourth control signal Ctr4 are all at the high potential to control the first thin film transistor M1, the second thin film transistor M2, and the sixth thin film transistor M6 to turn off. The scanning signal Scan is at the low potential in the preset substage T71 to control the third thin film transistor M3 to turn on in the preset substage T71, and the scanning signal Scan is at the high potential in the first data writing stage T3 other than the preset substage T71 to control the third thin film transistor M3 to turn off outside the preset substage T71. At this time, the data signal Data, the first supply voltage Vss1 and the second supply voltage Vss2 are all at the high potential, so that the data signal Data is written to the second node A2 via the third thin film transistor M3, and due to the coupling effect of the capacitor C, the potential of the fourth node A4 is a sum of the difference between absolute values of the first supply voltage Vss1 and the threshold voltage of the fourth thin film transistor M4 and the data signal Data, which is expressed by the formula $V_G=V_{S1}-|V_{TH}|+V_{DATA}$. It should be noted that for the closest two second light-emitting devices D2 on the same column, a rising edge (a signal edge from the low potential to the high potential) of the scanning signal Scan (n+1) of the second light-emitting device D2 that emits light first at the end of its preset substage T71 corresponds to a rising edge of the scanning signal Scan (n+3) (a signal edge from the high potential to the low potential) of the light-emitting device that emits light later at the beginning of its preset substage T72.

Figure 8:
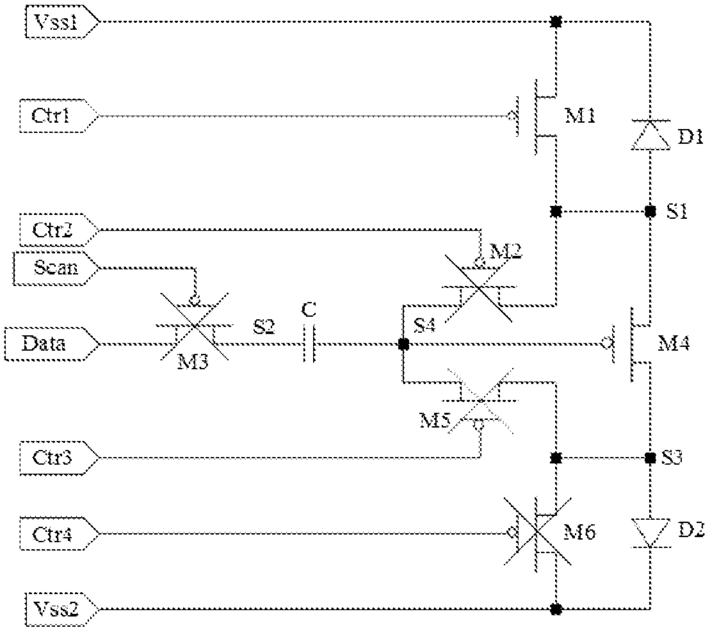
FIG. 8 is a schematic diagram of the pathway of the pixel driving circuit in a second light-emitting stage according to the first embodiment of the present application.

Referring to FIG. 1, FIG. 2 and FIG. 8, FIG. 8 is a schematic diagram of the pathway of the pixel driving circuit of the present application in the second light-emitting stage T8 under the driving timing shown in FIG. 2. In the second light-emitting stage T8, the first control signal Ctr1 is at the low potential to control the first thin film transistor M1 to turn on. The second control signal Ctr2, the fourth control signal Ctr4, the third control signal Ctr3 and the scanning signal Scan are all at the high potential to control the second thin film transistor M2, the sixth thin film transistor M6, the fifth thin film transistor M5 and the third thin film transistor M3 to turn off. At this time, the first supply voltage Vss1 is at the high potential, the second supply voltage Vss2 is at the negative potential, and the data signal Data is at the low potential. It should be noted that the negative potential of the second supply voltage Vss2 is less than its low potential, such that the potential of the first node A1 can be pulled up to the high potential of the first supply voltage Vss1, and the fourth thin film transistor M4 is turned on to generate the current flowing through the second light-emitting device D2, to drive the second light-emitting device D2 to emit light, the current flowing through the second light-emitting device D2 can be expressed by $$\begin{aligned} I_{OLED2} &= \frac{1}{2}\times\mu\times\frac{W}{L}\times C_{GI}\times(V_{sg}-V_{th})^2 = \\ &\frac{1}{2}\times\mu\times\frac{W}{L}\times C_{GI}\times(V_S-V_G-|V_{TH}|)^2 = \\ &\frac{1}{2}\times\mu\times\frac{W}{L}\times C_{GI}\times(V_{S1}-(V_{S1}-|V_{TH}|+V_{DATA})-|V_{TH}|)^2 = \\ &\frac{1}{2}\times\mu\times\frac{W}{L}\times C_{GI}\times(V_{DATA})^2 \end{aligned}$$

It can be seen that the current flowing through the second light-emitting device D2 light when the second light-emitting device D2 emits light is also only related to the data signal Data, and not related to the threshold voltage of the fourth thin film transistor M4, the first supply voltage Vss1 and the second supply voltage Vss2, that is, it does not vary with the change in the threshold voltage of the fourth thin film transistor M4, the first supply voltage Vss1 and the second supply voltage Vss2, to eliminate the influence of the threshold voltage defect of the fourth thin film transistor M4 and the voltage drop of the supply voltage on the current flowing through the second light-emitting device D2.

Second Embodiment

Figure 9:
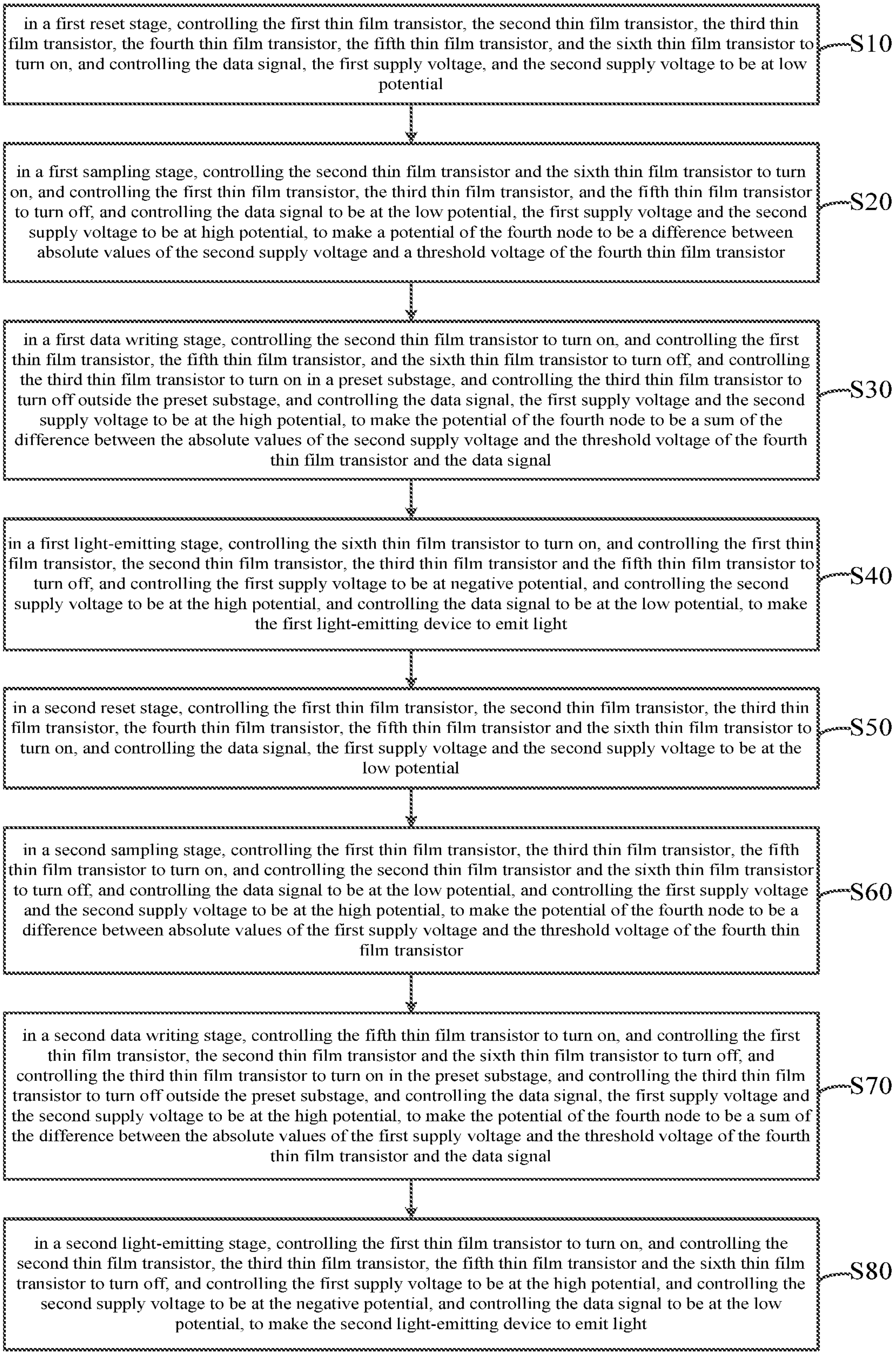
FIG. 9 is a flowchart of a pixel driving method according to a second embodiment of the present application.

Referring to FIG. 9, the present application also provides a pixel driving method applied to a pixel driving circuit, the specific structure of which refers to the above first embodiment. Since the pixel driving method adopts all the technical solutions of the above first embodiment, thus it has at least all the beneficial effects brought about by the technical solutions of the above first embodiment, which will not be repeated here.

The first control signal Ctr1, the second control signal Ctr2, the third control signal Ctr3, the fourth control signal Ctr4, the scanning signal Scan, and the data signal Data are combined and applied successively to the first reset stage T1, the first sampling stage T2, the first data writing stage T3, the first light-emitting stage T4, the second reset stage T5, the second sampling stage T6, the second data writing stage T7, and the second light-emitting stage T8.

The pixel driving method includes:

Step S10, in the first reset stage T1, controlling the first thin film transistor M1, the second thin film transistor M2, the third thin film transistor M3, the fourth thin film transistor M4, the fifth thin film transistor M5, and the sixth thin film transistor M6 to turn on, and controlling the data signal Data, the first supply voltage Vss1 and the second supply voltage Vss2 to be at low potential. In this stage, the scanning signal Scan, the first control signal Ctr1, the second control signal Ctr2, the third control signal Ctr3, the fourth control signal Ctr4, the first supply voltage Vss1, the second supply voltage Vss2, and the data signal Data are all at the low potential, so that the pixel driving circuit can clear the residual charge to reset the terminal voltage of the capacitor C and the potential value of the controlled end of the fourth thin film transistor M4 to 0 quasi-location.

Step S20, in the first sampling stage T2, controlling the second thin film transistor M2 and the sixth thin film transistor M6 to turn on, and controlling the first thin film transistor M1, the third thin film transistor M3, and the fifth thin film transistor M5 to turn off, and controlling the data signal Data to be at low potential and the first supply voltage Vss1 and the second supply voltage Vss2 to be at high potential, to make the potential of the fourth node A4 to be a difference between absolute values of the second supply voltage Vss2 and the threshold voltage of the fourth thin film transistor M4. In this stage, the second control signal Ctr2 and the fourth control signal Ctr4 are at the low potential; the first control signal Ctr1, the scanning signal Scan, and the third control signal Ctr3 are at the high potential, such that the potential of the controlled end of the fourth thin film transistor M4, i.e., the potential of the fourth node A4, can be charged to the difference between the absolute values of the second supply voltage Vss2 and the threshold voltage of the fourth thin film transistor M4, which is expressed by the formula $V_G=V_{S2}-|V_{TH}|$, and at this time the potential value of the first node A1 is less than the high potential of the first supply voltage Vss1, to make the first light-emitting device D1 to be in the reverse bias state, to improve the aging process of the first light-emitting device D1.

Step S30, in the first data writing stage T3, controlling the second thin film transistor M2 to turn on, and controlling the first thin film transistor M1, the fifth thin film transistor M5 and the sixth thin film transistor M6 to turn off, and controlling the third thin film transistor M3 to turn on in the preset substage T31, and controlling the third thin film transistor M3 to turn off outside the preset substage T31, and controlling the data signal Data, the first supply voltage Vss1, and the second supply voltage Vss2 to be at the high potential, to make the potential of the fourth node A4 to be a sum of the difference between the absolute values of the second supply voltage Vss2 and the threshold voltage of the fourth thin film transistor M4 and the data signal Data. In this stage, the second control signal Ctr2 is at the low potential; the first control signal Ctr1, the third control signal Ctr3, and the fourth control signal Ctr4 are all at the high potential, and the scanning signal Scan is at the low potential in the preset substage T31 and at the high potential in the first data writing stage T3 other than the preset substage T31, so that the data signal Data can be written to the second node A2 via the third thin film transistor M3, and due to the coupling effect of the capacitor C, the potential of the fourth node A4 is the sum of the difference between the absolute values of the second supply voltage Vss2 and the threshold voltage of the fourth thin film transistor M4 and the data signal Data, which is expressed by the formula $V_G=V_{S2}-|V_{TH}|+V_{DATA}$.

Step S40, in the first light-emitting stage T4, controlling the sixth thin film transistor M6 to turn on, and controlling the first thin film transistor M1, the second thin film transistor M2, the third thin film transistor M3 and the fifth thin film transistor M5 to turn off, and controlling the first supply voltage Vss1 to be at negative potential, and controlling the second supply voltage Vss2 to be at high potential, and controlling the data signal Data to be at the low potential to make the first light-emitting device D1 to emit light. In this stage, the fourth control signal Ctr4 is at the low potential, and the first control signal Ctr1, the second control signal Ctr2, the scanning signal Scan and the third control signal Ctr3 are all at the high potential, so that the potential of the third node A3 can be pulled up to the high potential of the second supply voltage Vss2, and the fourth thin film transistor M4 is turned on to generate the current flowing through the first light-emitting device D1, to drive the first light-emitting device D1 to emit light. In addition, as can be seen from the expression of the current flowing through the first light-emitting device D1, the current flowing through the first light-emitting device D1 when the first light-emitting device D1 emits light is only related to the data signal Data and is not related to the threshold voltage of the fourth thin film transistor M4, the first supply voltage Vss1 and the second supply voltage Vss2, i.e., it does not vary with change in the threshold voltage of the fourth thin film transistor M4, the first supply voltage Vss1 and the second supply voltage Vss2, to eliminate the influence of the threshold voltage defect of the fourth thin film transistor M4 and the voltage drop of the supply voltage on the current flowing through the first light-emitting device D1.

Step S50, in a second reset stage T5, controlling the first thin film transistor M1, the second thin film transistor M2, the third thin film transistor M3, the fourth thin film transistor M4, the fifth thin film transistor M5, and the sixth thin film transistor M6 to turn on, and controlling the data signal Data, the first supply voltage Vss1, and the second supply voltage Vss2 to be at the low potential. In this stage, the scanning signal Scan, the first control signal Ctr1, the second control signal Ctr2, the third control signal Ctr3, the fourth control signal Ctr4, the first supply voltage Vss1, the second supply voltage Vss2 and the data signal Data are all at the low potential, so that the pixel driving circuit clears the residual charge to reset the terminal voltage of capacitor C and the potential value of the controlled end of the fourth thin film transistor M4 to the 0 quasi-location again.

Step S60, in the second sampling stage T6, controlling the first thin film transistor M1, the third thin film transistor M3, and the fifth thin film transistor M5 to turn on, and controlling the second thin film transistor M2 and the sixth thin film transistor M6 to turn off, and controlling the data signal Data to be at the low potential, and controlling the first supply voltage Vss1 and the second supply voltage Vss2 to be at the high potential, to make potential of the fourth node A4 to be the difference between the absolute values of the first supply voltage Vss1 and the threshold voltage of the fourth thin film transistor M4. In this stage, the first control signal Ctr1, the scanning signal Scan, and the third control signal Ctr3 are at the low potential, and the second control signal Ctr2 and the fourth control signal Ctr4 are at the high potential, so that the potential of the controlled end of the fourth thin film transistor M4, i.e., the potential of the fourth node A4, can be charged to the difference between the absolute values of the first supply voltage Vss1 and the threshold voltage of the fourth thin film transistor M4, which is expressed by the formula $V_G=V_{S1}-|V_{TH}|$, and the potential value of the third node A3 is less than the high potential of the second supply voltage Vss2 at this time, to make the second light-emitting device D2 to be in the reverse bias state, to improve the aging process of the second light-emitting device D2.

Step S70, in the second data writing stage T7, controlling the fifth thin film transistor M5 to turn on, and controlling the first thin film transistor M1, the second thin film transistor M2 and the sixth thin film transistor M6 to turn off, and controlling the third thin film transistor M3 to turn on in the preset substage T71, and controlling the third thin film transistor M3 to turn off outside the preset substage T71, and controlling the data signal Data, the first supply voltage Vss1, and the second supply voltage Vss2 to be at the high potential, to make the potential of the fourth node A4 to be the sum of the difference between the absolute values of the first supply voltage Vss1 and the threshold voltage of the fourth thin film transistor M4 and the data signal Data. In this stage, the third control signal Ctr3 is at the low potential, the first control signal Ctr1, the second control signal Ctr2, and the fourth control signal Ctr4 are all at the high potential, and the scanning signal Scan is at the low potential in the preset substage T71 and at the high potential in the first data writing stage T3 other than the preset substage T71, such that the data signal Data is written to the second node A2 via the third thin film transistor M3, and due to the coupling effect of the capacitor C, the potential of the fourth node A4 is the sum of the difference between the absolute values of the first supply voltage Vss1 and the threshold voltage of the fourth thin film transistor M4 and the data signal Data, which is expressed by the formula $V_G=V_{S1}-|V_{TH}|+V_{DATA}$.

Step S80, in the second light-emitting stage T8, controlling the first thin film transistor M1 to turn on, and controlling the second thin film transistor M2, the third thin film transistor M3, the fifth thin film transistor M5 and the sixth thin film transistor M6 to turn off, and controlling the first supply voltage Vss1 to be at the high potential, and controlling the second supply voltage Vss2 to be at negative potential, and controlling the data signal Data to be at the low potential, to make the second light-emitting device D2 to emit light. In this stage, the first control signal Ctr1 is at the low potential, and the second control signal Ctr2, the fourth control signal Ctr4, the third control signal Ctr3 and the scanning signal Scan are all at the high potential, so that the potential of the first node A1 can be pulled up to the high potential of the first supply voltage Vss1, and the fourth thin film transistor M4 is turned on to generate the current flowing through the second light-emitting device D2, to drive the second light-emitting device D2 to emit light. In addition, as can be seen from the expression of the current flowing through the second light-emitting device D2, the current flowing through the second light-emitting device D2 when the second light-emitting device D2 emits light is also only related to the data signal Data and is not related to the threshold voltage of the fourth thin film transistor M4, the first supply voltage Vss1 and the second supply voltage Vss2, i.e., it does not vary with the change in the threshold voltage of the fourth thin film transistor M4, the first supply voltage Vss1 and the second supply voltage Vss2, eliminate the influence of the threshold voltage defect of the fourth thin film transistor M4 and the voltage drop of the supply voltage on the current flowing through the second light-emitting device D2.

Third Embodiment

The present application also provides a display panel, which includes a pixel array and a pixel driving circuit, the specific structure of which is referred to the above first embodiment. Since the pixel driving method adopts all the technical solutions of the above first embodiment, it has at least all the beneficial effects brought about by the technical solutions of the above first embodiment, which will not be repeated herein.

The pixel array includes a first light-emitting device D1 and a second light-emitting device D2 adjacent to each other and located on a same column. The pixel driving circuit is connected to the first light-emitting device D1 and the second light-emitting device D2 for driving successively the first light-emitting device D1 and the second light-emitting device D2 to emit light according to the potential where the connected scanning signal Scan, the first control signal Ctr1, the second control signal Ctr2, the third control signal Ctr3, the fourth control signal Ctr4, the first supply voltage Vss1, the second supply voltage Vss2 and the data signal Data are at.

The above are only some embodiments of the present application, not to limit the scope of the present application. Any equivalent structural transformation made by using the content of the specification of the present application and the drawings under the inventive concept of the present application, or direct/indirect application in other related technical fields are included in the scope of the present application.

What is claimed is:

1. A pixel driving circuit, applied to a display panel provided with a pixel array, the pixel array comprising a first light-emitting device and a second light-emitting device adjacent to each other and located on a same column, wherein:

an anode of the first light-emitting device is connected to a first node and a cathode of the first light-emitting device is connected to a first supply voltage;

an anode of the second light-emitting device is connected to a third node and a cathode of the second light-emitting device is connected to a second supply voltage;

the pixel driving circuit comprises a first thin film transistor, a second thin film transistor, a third thin film transistor, a fourth thin film transistor, a fifth thin film transistor, a sixth thin film transistor and a capacitor;

a controlled end of the first thin film transistor is connected to a first control signal, a first end of the first thin film transistor is connected to the first supply voltage and a second end of the first thin film transistor is connected to the first node;

a controlled end of the second thin film transistor is connected to a second control signal, a first end of the second thin film transistor is connected to a fourth node and a second end of the second thin film transistor is connected to the second end of the first thin film transistor;

a controlled end of the third thin film transistor is connected to a scanning signal, a first end of the third thin film transistor is connected to a data signal and a second end of the third thin film transistor is connected to a second node;

a controlled end of the fourth thin film transistor is connected to the fourth node, a first end of the fourth thin film transistor is connected to the first node and a second end of the fourth thin film transistor is connected to a third node;

a controlled end of the fifth thin film transistor is connected to a third control signal, a first end of the fifth thin film transistor is connected to the fourth node and a second end of the fifth thin film transistor is connected to the third node;

a controlled end of the sixth thin film transistor is connected to a fourth control signal, a first end of the sixth thin film transistor is connected to the second end of the fifth thin film transistor, a second end of the sixth thin film transistor is connected to the second supply voltage; and an end of the capacitor is connected to the second node and another end of the capacitor is connected to the fourth node.

2. The pixel driving circuit according to claim 1, wherein the first control signal, the second control signal, the third control signal, the fourth control signal, the first supply voltage, the second supply voltage, the scanning signal, and the data signal are combined and applied successively to a first reset stage, a first sampling stage, a first data writing stage, a first light-emitting stage, a second reset stage, a second sampling stage, a second data writing stage, and a second light-emitting stage; and wherein the first light-emitting device emits light in the first light-emitting stage, and the second light-emitting device emits light in the second light-emitting stage.

3. The pixel driving circuit according to claim 2, wherein in the first reset stage and the second reset stage, the first thin film transistor, the second thin film transistor, the third thin film transistor, the fourth thin film transistor, the fifth thin film transistor and the sixth thin film transistor are turned on; and the data signal, the first supply voltage and the second supply voltage are at low potential.

4. The pixel driving circuit according to claim 2, wherein in the first sampling stage, the second thin film transistor and the sixth thin film transistor are turned on, the first thin film transistor, the third thin film transistor and the fifth thin film transistor are turned off, the data signal is at low potential, the first supply voltage and the second supply voltage are at high potential, and a potential of the fourth node is a difference between absolute values of the second supply voltage and a threshold voltage of the fourth thin film transistor; and in the second sampling stage, the first thin film transistor, the third thin film transistor, and the fifth thin film transistor are turned on, the second thin film transistor and the sixth thin film transistor are turned off, the data signal is at the low potential, the first supply voltage and the second supply voltage are at the high potential, and the potential of the fourth node is a difference between absolute values of the first supply voltage and the threshold voltage of the fourth thin film transistor.

5. The pixel driving circuit according to claim 4, wherein the first light-emitting device is in a reverse bias state in the first sampling stage, and the second light-emitting device is in the reverse bias state in the second sampling stage.

6. The pixel driving circuit according to claim 2, wherein in the first data writing stage, the second thin film transistor is turned on, the first thin film transistor, the fifth thin film transistor and the sixth thin film transistor are turned off, the third thin film transistor is turned on in a preset substage and the third thin film transistor is turned off outside the preset substage;

the data signal, the first supply voltage and the second supply voltage are at high potential, a potential of the fourth node is a sum of a difference between absolute values of the second supply voltage and a threshold voltage of the fourth thin film transistor and the data signal; and in the second data writing stage, the fifth thin film transistor is turned on, the first thin film transistor, the second thin film transistor and the sixth thin film transistor are turned off, the third thin film transistor is turned on in the preset substage, the third thin film transistor is turned off outside the preset substage, the data signal, the first supply voltage and the second supply voltage are at the high potential, and the potential of the fourth node is a sum of a difference between absolute values of the first supply voltage and the threshold voltage of the fourth thin film transistor and the data signal.

7. The pixel driving circuit according to claim 2, wherein in the first light-emitting stage, the sixth thin film transistor is turned on, the first thin film transistor, the second thin film transistor, the third thin film transistor and the fifth thin film transistor are turned off, the first supply voltage is at negative potential, the second supply voltage is at high potential and the data signal is at low potential; and in the second light-emitting stage, the first thin film transistor is turned on, the second thin film transistor, the third thin film transistor, the fifth thin film transistor and the sixth thin film transistor are turned off, the first supply voltage is at the high potential, the second supply voltage is at the negative potential and the data signal is at the low potential.

8. The pixel driving circuit according to claim 7, wherein when the first light-emitting device and the second light-emitting device emit light, a current flowing through the first light-emitting device and the second light-emitting device keeps constant with a change in a threshold voltage of the fourth thin film transistor.

9. A pixel driving method, applied to the pixel driving circuit according to claim 1, comprising:

in a first reset stage, controlling the first thin film transistor, the second thin film transistor, the third thin film transistor, the fourth thin film transistor, the fifth thin film transistor, and the sixth thin film transistor to turn on, and controlling the data signal, the first supply voltage, and the second supply voltage to be at low potential;

in a first sampling stage, controlling the second thin film transistor and the sixth thin film transistor to turn on, and controlling the first thin film transistor, the third thin film transistor, and the fifth thin film transistor to turn off, and controlling the data signal to be at the low potential, the first supply voltage and the second supply voltage to be at high potential, to make a potential of the fourth node to be a difference between absolute values of the second supply voltage and a threshold voltage of the fourth thin film transistor;

in a first data writing stage, controlling the second thin film transistor to turn on, and controlling the first thin film transistor, the fifth thin film transistor, and the sixth thin film transistor to turn off, and controlling the third thin film transistor to turn on in a preset substage, and controlling the third thin film transistor to turn off outside the preset substage, and controlling the data signal, the first supply voltage and the second supply voltage to be at the high potential, to make the potential of the fourth node to be a sum of the difference between the absolute values of the second supply voltage and the threshold voltage of the fourth thin film transistor and the data signal;

in a first light-emitting stage, controlling the sixth thin film transistor to turn on, and controlling the first thin film transistor, the second thin film transistor, the third thin film transistor and the fifth thin film transistor to turn off, and controlling the first supply voltage to be at negative potential, and controlling the second supply voltage to be at the high potential, and controlling the data signal to be at the low potential, to make the first light-emitting device to emit light;

in a second reset stage, controlling the first thin film transistor, the second thin film transistor, the third thin film transistor, the fourth thin film transistor, the fifth thin film transistor and the sixth thin film transistor to turn on, and controlling the data signal, the first supply voltage and the second supply voltage to be at the low potential;

in a second sampling stage, controlling the first thin film transistor, the third thin film transistor, the fifth thin film transistor to turn on, and controlling the second thin film transistor and the sixth thin film transistor to turn off, and controlling the data signal to be at the low potential, and controlling the first supply voltage and the second supply voltage to be at the high potential, to make the potential of the fourth node to be a difference between absolute values of the first supply voltage and the threshold voltage of the fourth thin film transistor;

in a second data writing stage, controlling the fifth thin film transistor to turn on, and controlling the first thin film transistor, the second thin film transistor and the sixth thin film transistor to turn off, and controlling the third thin film transistor to turn on in the preset substage, and controlling the third thin film transistor to turn off outside the preset substage, and controlling the data signal, the first supply voltage and the second supply voltage to be at the high potential, to make the potential of the fourth node to be a sum of the difference between the absolute values of the first supply voltage and the threshold voltage of the fourth thin film transistor and the data signal; and in a second light-emitting stage, controlling the first thin film transistor to turn on, and controlling the second thin film transistor, the third thin film transistor, the fifth thin film transistor and the sixth thin film transistor to turn off, and controlling the first supply voltage to be at the high potential, and controlling the second supply voltage to be at the negative potential, and controlling the data signal to be at the low potential, to make the second light-emitting device to emit light.

10. A display panel, comprising:

a pixel array comprising a first light-emitting device and a second light-emitting device adjacent to each other and located on a same column; and the pixel driving circuit according to claim 1, the pixel driving circuit being connected to the first light-emitting device and the second light-emitting device.

* * * * *